Patented May 22, 1934

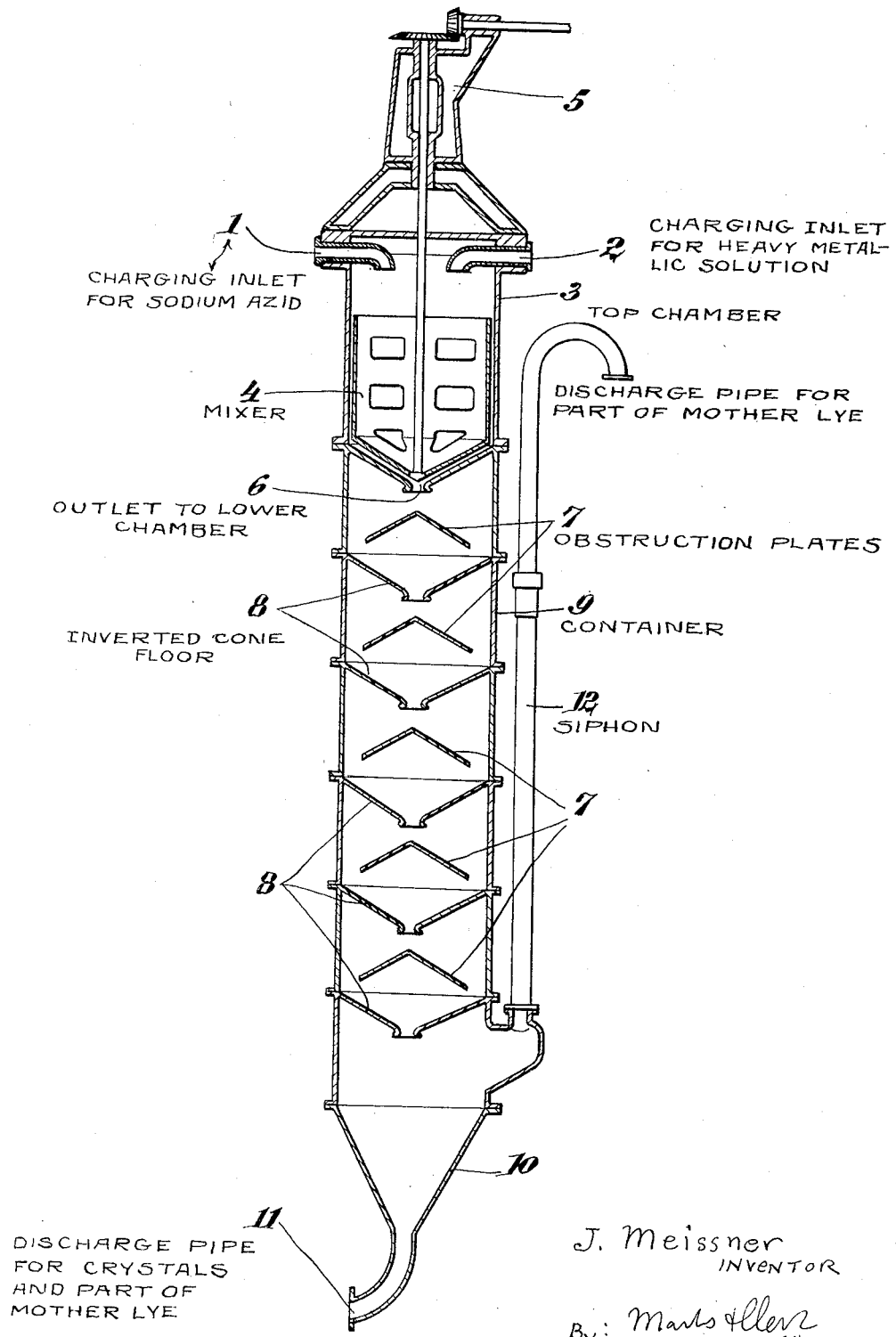

1,959,731

UNITED STATES PATENT OFFICE 1,959,731

PROCESS OF UNINTERRUPTEDLY CARRYING OUT THE PRECIPITATION OF HEAVY METALLIC AZIDS PARTICULARLY SILVER AND LEAD-AZID

Josef Meissner, Burbach, Germany

Application August 25, 1930, Serial No. 477,789
In Germany September 25, 1929

4 Claims. (Cl. 23—191)

Heretofore lead-azid has been produced in a great number of operations, which mainly deals with the solution, precipitation and washing of the initial products. A considerable time is required for the precipitation which is very dangerous. Heretofore the precipitation was carried out in such a manner that the solution of lead acetate or lead nitrate was charged into the precipitation apparatus and subsequently the solution of sodium azid instilled within a certain time thereby agitating the contents of the apparatus. A feature of the precipitation which is very troublesome, particularly in case of production on a large scale, resides in the fact that the process of precipitation has to be carried out in a number of different apparatus, separately arranged in a number of buildings. In view thereof it has been necessary to convey the lead-azid from place to place in the plant and in consequence of the sensitiveness of lead-azid this conveyance has been the cause of accidents owing to the inadvertence of the workmen. Also the attendance to such a large number of apparatus, mainly for the cleaning of the same, is very dangerous and frequently has been the cause of explosions. The great danger combined with the production of lead-azid, by the use of the extended process of precipitation and the difficult treatment of the apparatus, prevented the general use during the production on a large scale, so that only very few plants producing on a large scale are operating at the present time.

The drawbacks of the known processes of producing lead-azid by means of interrupted precipitation are:—

1. Long time needed by the process of precipitation and therefore small efficiency of each apparatus.
2. High costs of the apparatus in case of large yield.
3. High costs of erecting buildings in case of large yield.
4. Dangerous process of precipitation owing to the long time necessary therefor.
5. Dangerous attendance to the apparatus.

It is the aim of the present invention to carry out every chemical process in an uninterrupted operation. By means of experiments it has been found that heavy metallic azids, mainly silver and lead-azid, ought to be produced in an uninterrupted process of precipitation. An apparatus has been constructed in which the precipitation can be carried out in an uninterrupted manner, the solutions of the primary products being supplied into the apparatus in quantities, which exactly suit the progress of the process of precipitation.

The process proceeds for the precipitation of lead-azid according to the following reaction-equation: $2NaN_3 + Pb(NO_3)_2 = Pb(N_3)_2 + 2NaNO_3$ or for the precipitation of silver azid according to the equation: $NaN_3 + AgNO_3 = AgN_3 + NaNO_3$.

The solutions, which are supplied separately into the apparatus, are intimately mixed in the top portion thereof and start the process of precipitation, whereby crystallization takes place immediately. The apparatus comprises an upper chamber and a lower chamber. In the bottom of the upper chamber, which separates both chambers, is provided a discharge or outlet to the lower chamber which outlet is of such dimensions that the liquid introduced in the upper chamber must remain therein for some time. The crystals are increased to their final bulk by passing through the apparatus, while obstructions are conveniently arranged in the apparatus to regulate the time of passage. The entire or a part of the mother lye together with the lead-azid leaves the apparatus through the bottom part thereof. The mother lye is dammed up in the apparatus by a tubular siphon, which also regulates the level of the liquid while the actual outlet is constructed in such a manner, that not the entire but only a part of the mother lye together with the crystals flows off, while the remaining part of the said lye leaves the apparatus by way of the tubular siphon.

The advantages of the uninterrupted carrying out of the process of precipitation are:—

1. Greatest yield with an apparatus of relatively small size.
2. Small space required and therefore small costs of erection.
3. Very low costs of operation.
4. Increased security of operation.

A construction of the apparatus for uninterruptedly carrying out the process of precipitation is illustrated in the drawing.

The suitable quantities of solutions are separately charged into the apparatus by way of the supply-pipes 1 and 2. The regulation of the liquids to be supplied in exact proportions can be carried out in any convenient manner. The mixer 4 is arranged in the top chamber 3 of the apparatus and mixes the solutions as well as causes the crystallization. The mixer is mounted in a bearing. An outlet 6 of suitable size is arranged in the upper part of the apparatus. Downwardly sloping plates forming obstructions 7 and intermediate floors 8 in the shape of inverted cones are mounted in the apparatus. All of said members are located in a cylindric container 9, provided with an outlet 10 in the bottom part thereof for the formed crystals and a part of the mother lye which leave the apparatus by way of a short pipe 11. A tubular siphon 12 serves for damming up the mother lye and regulating the liquid-level in the apparatus, as well as for the discharge of another part of the mother lye.

The apparatus is constructed in suitable manner and of convenient materials.

I claim:—

1. A process of continuously precipitating highly explosive heavy metallic azids, which consists in continuously bringing together the primary products in suitable quantities and thoroughly mixing said products thereby causing immediate precipitation of the heavy metallic azid in the form of crystals, carrying said crystals with the mother lye over a row of obstructions thereby increasing the bulk of the crystals, and carrying away said crystals in the finished state with a portion of the now exhausted mother lye.

2. A process of continuously precitating highly explosive heavy metallic azids, which consists in continuously bringing together the primary products in suitable quantities and thoroughly mixing said products thereby causing immediate precipitation of the heavy metallic azid in the form of crystals, carrying said crystals with the mother lye over a row of obstructions thereby increasing the bulk of the crystals, carrying away said crystals in the finished state, and leading away separately the mother lye now exhausted.

3. A process of continuously precipitating highly explosive heavy metallic azids, which consists in continuously bringing together the primary products in suitable quantities and thoroughly mixing said products thereby causing immediate precipitation of the heavy metallic azid in the form of crystals, carrying said crystals with the mother lye over a row of obstructions thereby increasing the bulk of the crystals, regulating the level of the mother lye for controlling the growth of the crystals during the passage over the obstructions, and carrying away said crystals in the finished state with a portion of the now exhausted mother lye.

4. A process of continuously precipitating highly explosive heavy metallic azids, which consists in continuously bringing together the primary products in suitable quantities and thoroughly mixing said products thereby causing immediate precipitation of the heavy metallic azid in the form of crystals, carrying said crystals with the mother lye over a row of obstructions thereby increasing the bulk of the crystals, regulating the level of the mother lye for controlling the growth of the crystals during the passage over the obstructions, carrying away said crystals in the finished state, and leading away separately the mother lye now exhausted.

JOSEF MEISSNER.